United States Patent
Bassan et al.

(10) Patent No.: US 10,584,913 B2
(45) Date of Patent: Mar. 10, 2020

(54) METHOD OF MANUFACTURING A LINER, LINER, AND APPLIANCE

(71) Applicant: ELECTROLUX APPLIANCES AKTIEBOLAG, Stockholm (SE)

(72) Inventors: Alfredo Bassan, Porcia (IT); Carlo Tomaselli, Porcia (IT); Corrado Cecchini, Porcia (IT); Massimo Sanita, Porcia (IT)

(73) Assignee: Electrolux Appliances Aktiebolag, Stockholm (SE)

( * ) Notice: Subject to any disclaimer, the term of this patent is extended or adjusted under 35 U.S.C. 154(b) by 628 days.

(21) Appl. No.: 15/032,349

(22) PCT Filed: Dec. 5, 2014

(86) PCT No.: PCT/EP2014/076769
§ 371 (c)(1),
(2) Date: Apr. 27, 2016

(87) PCT Pub. No.: WO2015/096968
PCT Pub. Date: Jul. 2, 2015

(65) Prior Publication Data
US 2016/0290708 A1 Oct. 6, 2016

(30) Foreign Application Priority Data
Dec. 23, 2013 (EP) .................................. 13199295

(51) Int. Cl.
*F25D 23/06* (2006.01)
*B29C 48/08* (2019.01)
*B29C 48/00* (2019.01)
*B29C 53/06* (2006.01)
(Continued)

(52) U.S. Cl.
CPC ........ *F25D 23/066* (2013.01); *B29C 48/0019* (2019.02); *B29C 48/0022* (2019.02); *B29C 48/08* (2019.02); *B29C 53/063* (2013.01); *B29C 53/066* (2013.01); *B29K 2023/12* (2013.01);
(Continued)

(58) Field of Classification Search
None
See application file for complete search history.

(56) References Cited

U.S. PATENT DOCUMENTS 3,148,103 A * 9/1964 Gallagher ............... B29C 65/48
156/224
3,622,418 A * 11/1971 Black ....................... B01J 23/40
156/217

(Continued)

FOREIGN PATENT DOCUMENTS

| WO | 93/21262 A1 | 10/1993 |
| WO | 95/21056 A1 | 8/1995 |
| WO | 2011017793 A1 | 2/2011 |

OTHER PUBLICATIONS

Wikipedia article on polypropylene (Year: 2019).*
International Search report for PCT/EP2014/076769, dated Feb. 18, 2015, 2 pages.

*Primary Examiner* — Barbara J Musser
(74) *Attorney, Agent, or Firm* — Pearne & Gordon LLP

(57) ABSTRACT

A method for manufacturing a liner, in particular for the cabinet of a refrigerator, allowing to leave out a deep thermoforming step. The method includes extruding a sheet, trimming the sheet, folding the sheet and joining adjacent edges of the sheet.

10 Claims, 4 Drawing Sheets

(51) Int. Cl.
*B29L 31/00* (2006.01)
*B29K 23/00* (2006.01)

(52) U.S. Cl.
CPC . *B29K 2995/004* (2013.01); *B29L 2031/7622* (2013.01)

(56) References Cited

U.S. PATENT DOCUMENTS

| | | | | |
|---|---|---|---|---|
| 3,813,137 | A | * 5/1974 | Fellwock | F25D 23/066 220/592.1 |
| 4,842,742 | A | 6/1989 | Plante | |
| 5,223,194 | A | * 6/1993 | Rosen | B29C 43/222 264/173.14 |
| 5,580,409 | A | 12/1996 | Andersen et al. | |
| 2002/0162734 | A1* | 11/2002 | Foster | C02F 1/14 203/10 |
| 2012/0193365 | A1* | 8/2012 | Humphries | B29C 53/063 220/592.2 |

* cited by examiner

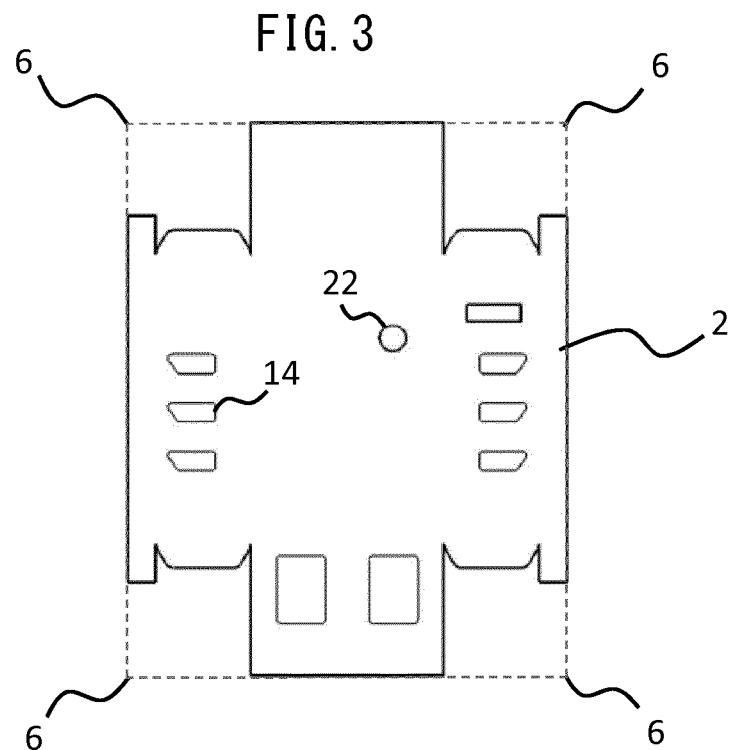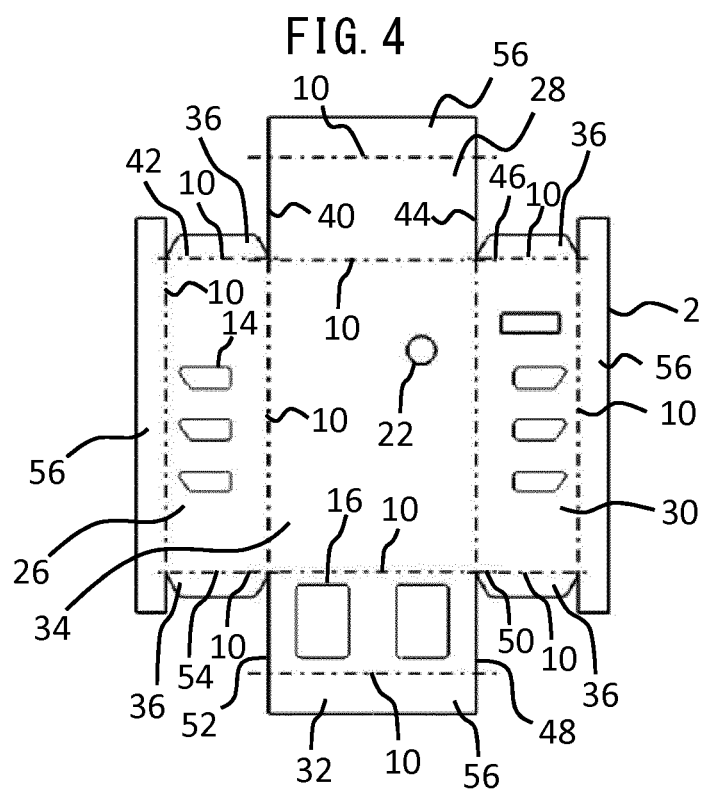

METHOD OF MANUFACTURING A LINER, LINER, AND APPLIANCE

The invention refers to a method for manufacturing a liner. It further refers to a liner obtained by this method and an appliance with a liner.

BACKGROUND ART

The manufacturing process of inner liners and door liners of refrigerating appliances usually comprises the process of sheet extrusion and one or several thermoforming phases. The plastic material often used is basically styrenics, for instance high impact polystyrene, polystyrene, ABS, which is extremely easy to process by extrusion and by thermoforming. The reason for the easy performance in processing the material is its amorphous nature.

Alternative sheet materials are polypropylene or other semi-crystalline polymers. Due to their chemical nature, however, which is inherently semi-crystalline, it is difficult to thermoform big and/or spatially extended parts made of these materials having high stretching ratios such as inner liners. The constraints on the desired shapes limit the "drop-in" replacement of styrenics by polypropylene. Commercial grades of polypropylene suitable for highly stretched parts are not currently available.

The current production of liners usually comprises as a first step a sheet extrusion with current extrusion rates of 500 kg/h-1,500 kg/h. The sheets are then cut in suitable dimension. The production process involves batches of hundreds of sheets. The batches are stored in warehouses to cool down for usually five days. After they have sufficiently cooled down, the sheets are thermoformed in order to get inner liners or door liners. The duration of a thermoforming cycle per part is typically between 30 s and 45 s.

A method for manufacturing refrigerator liners from crystalline synthetic resins is disclosed in U.S. Pat. No. 4,842,742, whereby polypropylene is used for sheets. The method described therein is called hybrid forming process, involving solid phase vacuum, stretch and pressure forming techniques. The polypropylene material is extruded and then cut into suitable billets. These billets are allowed to cool down for a short time before they are delivered to a forming station. A disadvantage of the described method is the operating expense due to the employment of several methods.

A method for making sheets and articles thermoformed is disclosed in WO 93/21262, whereby this method involves thermoforming a resinous polymer of propylene-containing sheet with steps of melt forming, quenching, heating, and thermoforming. It has therein been found that an effective amount of beta-spherulite nucleating agent is useful for preparing a thermoformable sheet. A disadvantage of this method lies in the requirement of the presence of a special agent in the material which creates extra production costs.

The object of the present invention is to provide a manufacturing method for liners, especially for inner liners for refrigerators, which avoids the vacuum forming step or deep thermoforming step.

Another object of the invention is to provide a method for manufacturing liners with efficient production rates and allowing for non-amorphous materials.

Still another object of the invention is to provide a liner that can be produced in an efficient and time-saving process.

Yet another object of the invention is to provide a household appliance with such a liner.

DISCLOSURE OF INVENTION

The present invention therefore relates, in a first aspect thereof, to a method for manufacturing a liner, especially for a refrigeration appliance, comprising the steps of
a) extruding a sheet,
b) perimeter trimming the sheet,
c) folding the sheet and joining adjacent edges.

Preferred embodiments of the invention are described in relation to the dependent claims and the description in relation to the enclosed drawings.

The invention is based on the consideration that the high stretching operations during the thermoforming process provide twofold limitations on the manufacturing process of liners. On the one hand, for these operations the sheet temperature needs to be quite homogenous, typically requiring a cooling down time of up to several days before the sheets can be further processed. On the other hand, the chosen sheet material has to be able to allow this stretching without breaking or getting deteriorated.

Applicant has recognized that the extent of the sheet stretching can be limited if the sheet is pre-shaped by perimeter trimming to obtain a cut sheet and if the final shape is then achieved by a folding operation. Therefore, after being pre-shaped, the extruded sheets can directly be folded, avoiding the long storage time of several days in order to homogenize the sheet temperature.

Hence, the method according to the invention is preferably characterized in that the vacuum or deep thermoforming step following the extrusion of the sheet can be omitted. The pre-shaping or perimeter trimming step can therefore follow immediately after the extruding step, whereby "immediately" means without delays caused by the cooling of the extruded sheet. The method is also characterized by the building of a 3d-structure from a flat sheet by perimeter trimming, folding and edge joining, leading to a box-like or cabinet-like object.

The present method, due to its perimeter trimming step, does not involve deep or vacuum thermoforming steps with sheet-stretching operations with high stretching ratios that alter the overall geometrical dimensions of the pre-shaped sheet, especially its maximal length and width.

Preferably the respective sheet is made of material comprising semi-crystalline polymers, especially polypropylene. These materials are suitable for the present method since the step of deep thermoforming is avoided.

The respective sheet is preferably designed as a compact, alveolar or twin-wall sheet. It is, for instance, possible that the sheet comprises two walls with structures sandwiched between these two walls that resemble honeycombs. Such sheets are lighter compared to compact sheets and thus allow the manufacturing of light liners which are easy to handle in the manufacturing and packaging applications.

In a preferred embodiment the perimeter trimming is performed by cutting off a substantially or essentially rectangular shape in each corner of the sheet which has the shape of a rectangle. The terms "substantially" or "essentially" here indicate that the cut-off regions can have detailed structures which are comparatively small in relation to the overall size of the cut-out region. The cut pieces are basically rectangular to allow the folding of the sheet by folding four peripheral parts around a center or core part to obtain a box-like or cabinet-like 3D-structure as the resulting liner.

The cut-off rectangular shapes are essentially identical in shape, including shapes that are obtained from each other by applying mirror symmetry. Thus, a sheet is obtained which in its geometrical outer contour essentially resembles a cross. This way, a symmetrical 3D structure can be obtained after folding. Geometrically, the resulting form or shape can be described by a central rectangular part, comprising attached a respective peripheral part at each of its four sides, whereby peripheral parts attached to opposing edges of the central part have essentially equal dimensions, i.e. equal width and height. It is of course also possible to perform perimeter trimming by cutting off different shapes.

Advantageously, the geometrical stretch ratio, which is the ratio of the surface of the sheet after and before the trimming, forming and folding operations, in other words, the ratio between the liner surface area and sheet surface area, is lower than 3:2 or 3:1.

In a preferred embodiment, the method comprises a step of forming at least one hinge. The term "hinge" encompasses structures designed as folding lines along which two adjacent parts connected by the folding line can be folded with respect to each other.

Advantageously, at least four hinges are formed, whereby adjacent hinges are perpendicular to each other and are positioned between the above described central part of the sheet and the adjacent peripheral parts. The hinges preferably allow flapping or folding the peripheral parts with respect to the central part by an angle of 90° which allows forming a box-like structure with a back side, a top side, a bottom side and two sidewalls.

In a preferred embodiment, the method comprises a forming step of forming at least one structure into the sheet, the structure comprising a protrusion or intrusion of the sheet. Hence, this forming step results in changes of the shape of the sheet, while no material is removed or added. This step can be conducted employing low vacuum forming techniques or other forming techniques.

Regarding the time sequence of these steps, this forming step can follow the extrusion step and be performed before the perimeter trimming step or alternatively follow the perimeter trimming step.

Advantageously, at least one rib is formed in the sheet during this forming step. Preferably, pairs of ribs are formed which can serve as mounts for shelves to be inserted into the liner.

In a further preferred embodiment, the method comprises a step of cutting at least one hole into the sheet. These holes allow, for example, connecting accessories to a liner obtained after folding the sheet and/or attaching the liner to the body housing of an appliance. A hole can also provide for an outlet, for example for the cooling system.

The described forming operations can be performed by methods known in the art, as for example low thermoforming.

Preferably, during the folding step the trimmed sheet is folded at four hinges to form a box-like or box-shaped structure. The liner thus obtained by folding then essentially comprises top, bottom, back sides and two side walls or side panels. On the front, the thus obtained liner comprises no wall, which, if installed in an appliance, denotes the opening through which a person is able to reach into the liner and the appliance.

Advantageously, the method comprises a sealing step in which edges of parts of the sheet which are adjacent to each other after folding are sealed together. This way, on the one hand the resulting liner can be constructed or designed in a way that air or vapor is not allowed to leak out the liner between adjacent edges. One the other hand, this step provides additional stability to the liner and ensures that it keeps its box-shaped form.

The sheet thickness is preferably less than 2 mm. A sheet thickness of such comparably low values compared to sheet thicknesses used in known methods becomes possible due to the fact that high stretching operations which inevitably lead to material thinning and thus to a continuous reduction of the sheet thickness are avoided in the method according to the present invention.

In a second aspect thereof, the present invention concerns a liner which is obtained by the method described above. It especially concerns a cabinet or inner or door liner for a household appliance such as a refrigerator.

Advantageously, the liner comprises four adjacent hinges, allowing the folding of the liner into a box-shaped structure. The hinges preferably separate four peripheral rectangular parts from a rectangular middle or central part leading to a box- or container-type structure if all peripheral parts are folded by an angle of 90° around the respective hinges in the same folding direction with respect to the central part of the sheet.

In a preferred embodiment, the liner comprises at least one hinge comprising a sheet region of reduced thickness with a first recesses and a second recess on opposite sides of the sheet, the respective recess being preferably essentially shaped as a segment of a circle with transitions to two parallel lines.

Preferably, the minimum distance between the recesses is between 0.2 mm and 0.4 mm.

The depth of the first recess is preferably considerably, especially more than three times, smaller than the depth of a second recess and is especially between 0.1 mm and 0.2 mm and is in particular 0.15 mm.

In a third aspect thereof, the present invention concerns an appliance with a liner described above. Preferably, the appliance is a household appliance, for example a refrigeration appliance or refrigerator.

The advantages of the application are especially as follows. Due to the possibility of avoiding the deep or vacuum forming operations which usually involve high stretching operations, materials with difficult thermoforming behavior can be employed, as for instance semi-crystalline materials. In the production of inner liners for refrigerators and freezers, with the method according to the present invention crystalline polymers can be used (i.e. polypropylene and polypropylene compounds), which cannot be used in known methods employing vacuum forming since these parts have particularly high stretching ratio (ratio between liner surface area and sheet surface area) applying efficient cycle times.

The replacement of polystyrene by polypropylene can lead to cost reduction. It is possible to use the conventional polypropylene extrusion grade. Further cost reduction can be achieved by employing polypropylene-filled compounds such as Carboran™.

The speed of the manufacturing process is increased since the sheet storage time is eliminated after extrusion as it is possible to immediately thermoform the liner. Moreover, the manufacturing process can be optimized by space reduction which can lead to a compact factory layout.

The inherent longer thermoforming cycle of semi-crystalline plastic can be mitigated due to the possibility of using thinner sheets despite the wider surface involved in the process.

BRIEF DESCRIPTION OF THE DRAWINGS

Further characteristics and advantages of the present invention will be highlighted in greater detail in the following detailed description of some of its preferred embodiments, provided with reference to the enclosed drawings. In said drawings:

FIG. 3 shows the sheet after a method step of cutting of holes and perimeter trimming;

FIG. 4 shows the sheet after a method step of forming hinges;

DETAILED DESCRIPTION OF THE INVENTION

Figure 1:
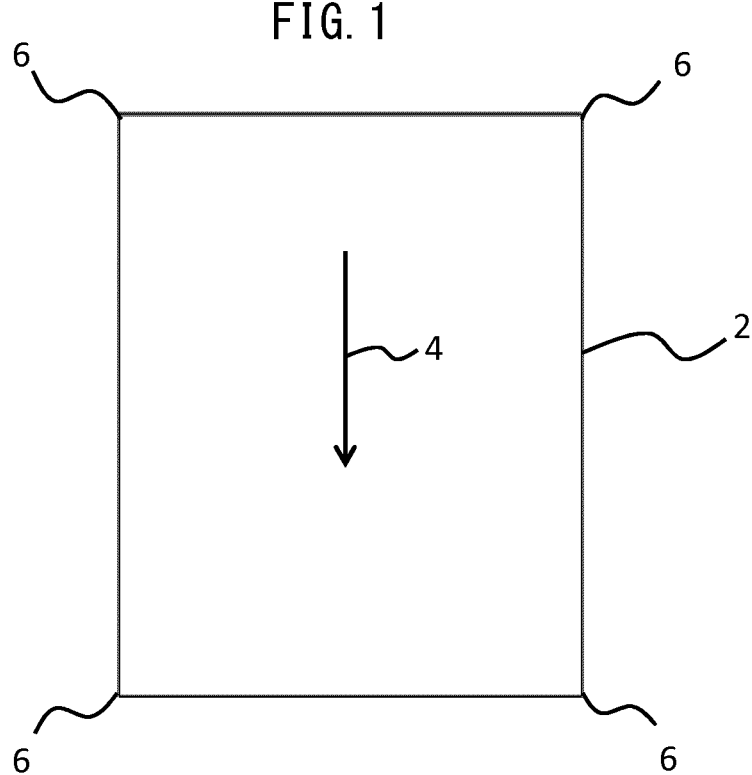
FIG. 1 shows an extruded sheet.

With reference to FIG. 1, a sheet 2 is shown which has been extruded in extrusion direction 4, which is a first step or procedure of the manufacturing method according to the present invention. The extrusion process can be performed by an extruding apparatus as known from the art.

The extruded sheet 2 comprises a rectangular form or shape having a side lengths which lie between 1.5-2.5 m in the present preferred embodiment. The sheet 2 is displayed in FIG. 2 after structural features such as ribs 14 and ribs 16 have been formed in a forming step. The forming step can further involve low deep drawing forming, which can be conducted by a conventional process known from the art such as vacuum forming, hot sheet forming etc. The forming step can in preferred embodiments be conducted by thermoforming or other suitable methods and is only an optional step in the described method.

With reference to FIG. 3, sheet 2 is shown after it has gone through a perimeter trimming operation in which in the regions of each of its four corners 6, a substantially rectangular piece was cut off, resulting in a pre-shaped sheet 2 for the forthcoming operations. The cut-off rectangular pieces in the present embodiment are all of the same size and—taken into account mirror symmetry—identical in shape.

Figure 5:
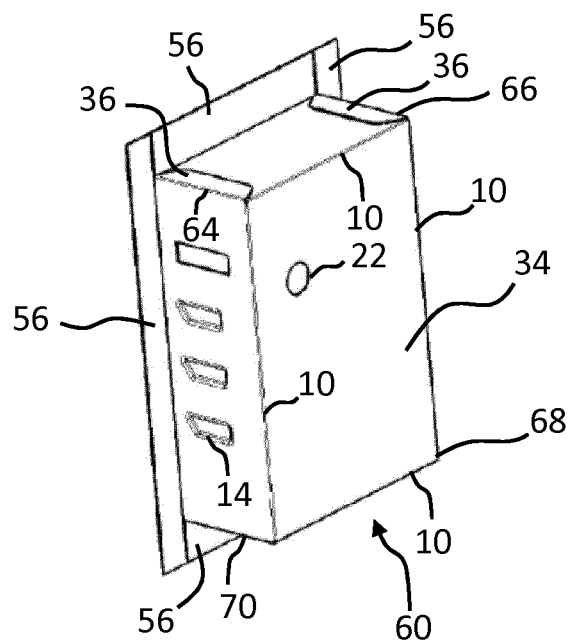
FIG. 5 shows the sheet after a method step of folding it to obtain a box-shaped structure.

The perimeter trimming as described in connection with FIG. 3 has a distinct advantage over techniques known form the art: the usual step of deep thermoforming sheet 2 displayed in FIG. 1 involving high stretching of the sheet 2 to obtain the shape of the liner shown in FIG. 5 can be avoided. This way, the forming step(s) can directly follow the extrusion step, with the intermediate step of pre-shaping sheet 2.

The necessity to perform large stretching operation of conventional methods limits the choice of materials for the liner: for large stretching operations, the material has to allow this procedure without getting corrupt in its consistency and constitution, which is usually only the case if an amorphous material is chosen. In the method according to the invention, since the large stretching operations are not necessary, also semi-crystalline materials such as polypropylene can be employed.

In another forming step, which can also be combined with at least one of the previous forming steps, hinges 10 are formed. In FIG. 4, the sheet 2 is shown after a plurality of hinges 10 or folding lines has been formed. For this forming step, various methods known form the art can be employed. In the present embodiment, the forming station is a thermoforming station. Further referring to FIG. 3, subsequently, sheet 2 is processed to provide holes, especially for use in connection with accessories, and other structural features. As an example, an outlet for the cooling system has been formed by cutting or punching a circular hole 22 into the sheet 2. Another hole 22 with a rectangular shape has also been cut into the sheet 2 which is designed as a fixation point of a control box for the refrigerator. Hinges 10 are formed by appropriate tools, for instance heated coining heads. A preferred embodiment of the hinges will be described in connection with FIG. 7.

Figure 2:
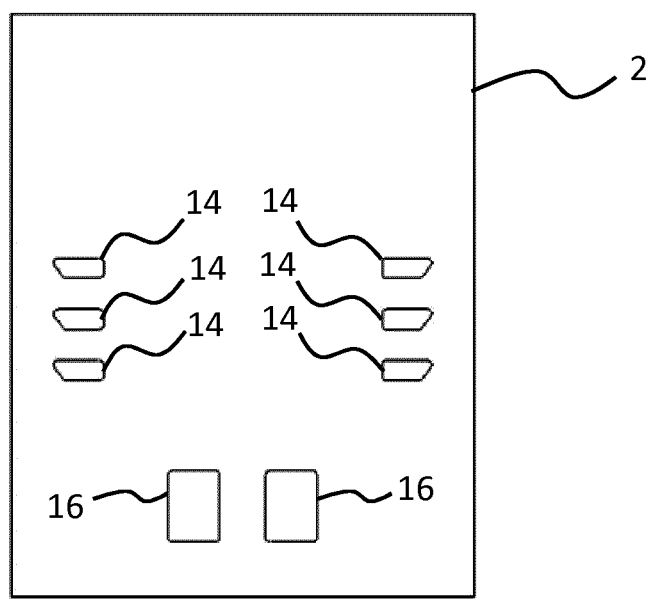
FIG. 2 shows the sheet after a method step of forming ribs.

The forming steps according to FIGS. 2, 3 and 4 can be performed in the order shown or in any other order which leads to an effective production cycle. All or a selection of these forming steps can also be performed simultaneously.

Up to this stage, sheet 2 has stayed flat. The next method step involves a folding operation to obtain the liner which in the present embodiment is a cabinet liner. Sheet 2 is folded along hinges 10 in such a way that peripheral rectangular parts 26, 28, 30, 32 are folded by an angle of 90° around the respective hinges 10 which connect them to a central part 34 of sheet 2. By this folding operation, adjacent edges and folding lines of neighboring peripheral parts 26, 28, 30, 32 are moved next to each other two by two into a parallel position. This way, edges 40 and 42, edges 44 and 46, edges 48 and 50, and edges 52 and 54 are aligned next to each other. The peripheral parts 26 and 30 comprise, respectively, two flanges 36. Peripheral parts 26, 28, 30, 32 comprise border elements 56 which are folded by 90° around the respective hinges to form a frame which can serve both as a blocking element as well as a covering element when inserting the liner into the housing of a refrigerating appliance. If necessary, the edges of the sheet 2 to be joined this way can be shaped by milling to allow a seamless joining. The folding operation leads to the cabinet liner 60 displayed in FIG. 5.

Figure 6:
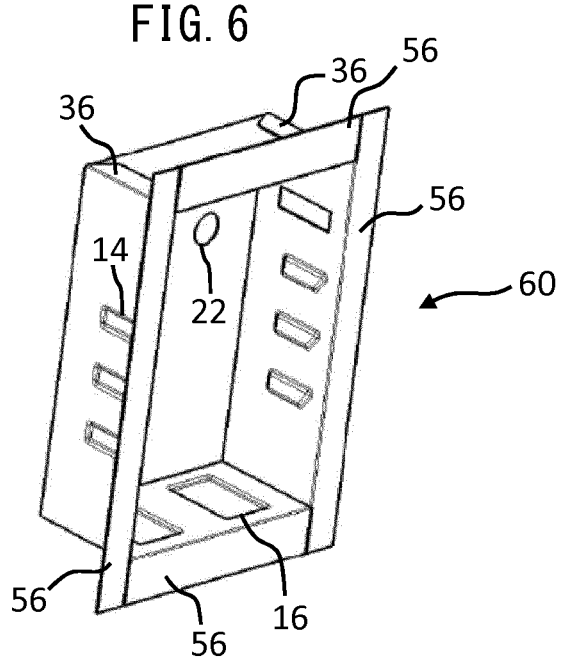
FIG. 6 shows the sheet after a method step of sealing edges to obtain a liner.

With respect to FIG. 6, the folding procedure results in the cabinet liner 60 with folded edges 64, 66, 68, 70 which can optionally be joined by adhesive tape and/or undergo hedge sealing. The flanges 36 have been folded by 90° and rest and/or are attached to adjacent peripheral parts 28, 30, 32, 34.

After the folding step, in a foaming step the cabinet liner 60 is put into a foaming tool and foamed, after which it is ready to be deployed in a household appliance, especially a refrigeration appliance or refrigerator.

Figure 7:
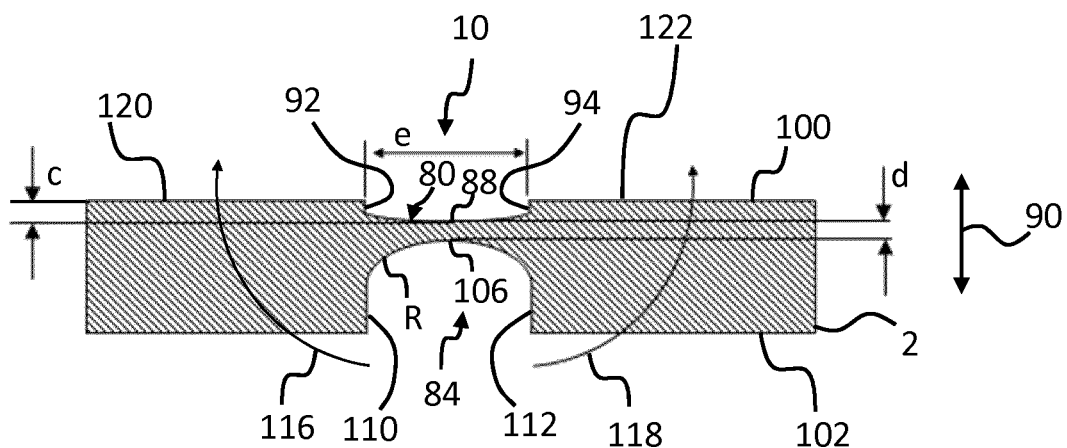
FIG. 7 shows a detailed view of a preferred embodiment of a hinge formed in the sheet.

An advantageous embodiment of a hinge 10 is illustrated in FIG. 7 in a side view of sheet 2. The hinge 10 comprises a first recess 80 and a second recess 84 on opposite sides of sheet 2. First recess 80 comprises a segment 88 which is basically geometrically shaped like a segment of a circle, the circle having a radius larger than a depth c of the recess 80 oriented in a direction 90 along the depth of sheet 2 and perpendicular to its surfaces. Segment 88 on both sides is connected to lines 92, 94 being parallel to direction 90, thus being perpendicular to a first and second surface of sheet 2.

Second recess 84 likewise comprises a segment 106 basically being a segment of a circle which on both sides is connected to lines 110, 112 running parallel to lines 92, 94 of the first recess 80 and parallel to direction 90. The corresponding radius R of circular segment 106 is in the present embodiment 0.80 mm and smaller than the one related to segment 88, while the depth in direction 90 of the second recess 84 is approximately six times larger than the depth of the first recess. Depth c of first recess 80 is 0.15 mm as shown in the embodiment. A depth d which corresponds to the minimum distances of both recesses 80, 84, if oriented in direction 90, is between 0.2 mm and 0.4 mm. A width e of both recesses 80, 84 is 1.5 mm.

Bend arrows 116, 118 indicate the folding directions of parts 120, 122 which are separated by the hinge 10 between them. After the folding operation, parts 120 and 122 will be substantially perpendicular to each other.

The design of the hinges 10 is not limited to the hinge design described and can in other preferred embodiments be designed differently, as long as it allows a sufficient folding of its adjacent parts. For instance, it can be designed with triangular recesses in the sheet or any other recesses which leads a folding line and therefore to a deformable or bendable part of the sheet.

Figure 8:
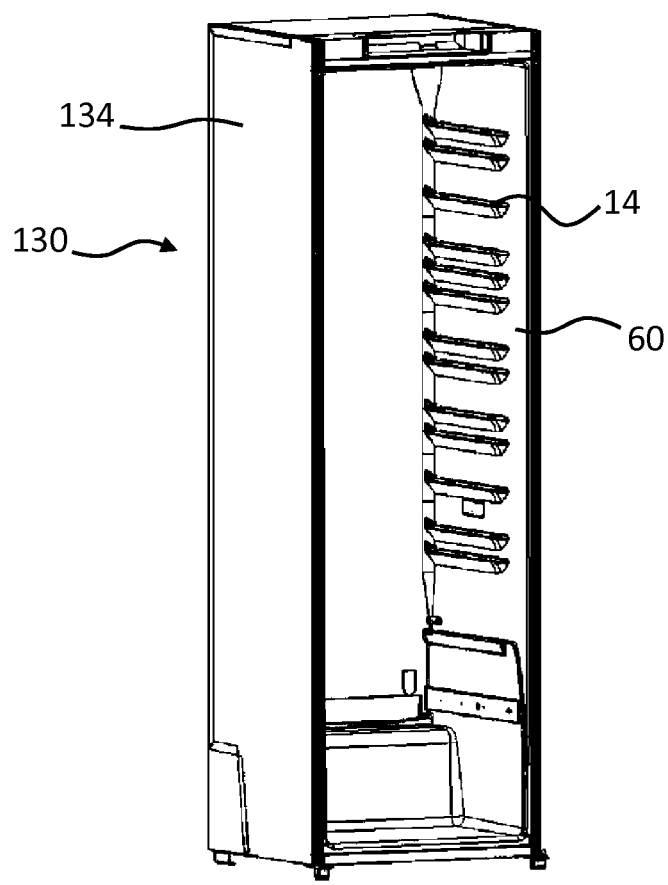
FIG. 8 shows a refrigeration appliance with a liner.

With respect to FIG. 8, in a frontal perspective view, part of a refrigeration appliance 130 is shown with a cabinet liner 60, which is fit into and attached to a housing 134. In particular, the liner 60 is enclosed in an outer shell of the cabinet, and defines one or more internal compartments for food storage. Between the outer shell and the liner, an insulation layer is provided.

While the present invention has been described with reference to the particular embodiments shown in the figures it should be noted that the present invention is not limited to the specific embodiments illustrated and described herein; on the contrary, further variants of the embodiments described herein are within the scope of the present invention as defined in the claims.

LIST OF REFERENCE NUMERALS 2 sheet
4 extrusion direction
6 corner
10 hinge
14 rib
16 rib
22 hole
26 peripheral part
28 peripheral part
30 peripheral part
32 peripheral part
34 central part
36 flange
40 edge
42 edge
44 edge
46 edge
48 edge
50 edge
52 edge
54 edge
56 border element
60 cabinet liner
64 folded edge
66 folded edge
68 folded edge
70 folded edge
80 first recess
84 second recess
90 direction
92 line
94 line
100 first surface
102 second surface
106 segment
110 line
112 line
116 arrow
118 arrow
120 part
122 part
130 refrigeration appliance
134 housing
c depth
d depth
e width
R radius

The invention claimed is:

1. Method for manufacturing a refrigeration appliance (130), comprising:
    manufacturing a liner (60) for the refrigeration appliance (130) by:
        extruding a sheet (2),
        perimeter trimming said sheet (2), and
        folding said sheet (2) and joining adjacent edges (40, 42, 44, 46, 48, 50, 52, 54),
    whereby said sheet (2) is designed as a twin-wall sheet (2).

2. Method according to claim 1, wherein the method further includes a forming step of forming at least one structure into said sheet (2) before folding said sheet (2), the at least one structure comprising a protrusion, an intrusion, and/or a hole.

3. Method according to claim 2, wherein the at least one structure comprises at least one hinge (10).

4. Method according to claim 2, wherein the at least one structure comprises the protrusion or the intrusion.

5. Method according to claim 2, wherein the at least one structure comprises the hole, the hole being cut into said sheet (2).

6. Method according to claim 1, whereby said sheet (2) is made of material comprising semi-crystalline polymers.

7. Method according to claim 1, whereby said sheet (2) has a rectangular shape and perimeter trimming is performed by cutting off a substantially rectangular shape in each corner (6) of said sheet (2).

8. Method according to claim 1, whereby said cut-off rectangular shapes are identical in shape.

9. Method according to claim 1, comprising a sealing step in which edges of parts (26, 28, 30, 32) of said sheet (2) which are adjacent to each other after folding are sealed together.

10. Method according to claim 1, comprising a step of fitting the liner (60) within an outer housing (134) and attaching the liner (60) to the outer housing (134).

* * * * *